US011698797B2

(12) United States Patent
Somisetty

(10) Patent No.: US 11,698,797 B2
(45) Date of Patent: Jul. 11, 2023

(54) APPLICATION TUNING BASED ON PERFORMANCE CHARACTERISTICS

(71) Applicant: MICRO FOCUS LLC, Santa Clara, CA (US)

(72) Inventor: Harish Kumar Somisetty, Bangalore (IN)

(73) Assignee: MICRO FOCUS LLC, Sanford, NC (US)

( * ) Notice: Subject to any disclaimer, the term of this patent is extended or adjusted under 35 U.S.C. 154(b) by 0 days.

(21) Appl. No.: 17/365,787

(22) Filed: Jul. 1, 2021

(65) Prior Publication Data
US 2023/0004403 A1   Jan. 5, 2023

(51) Int. Cl.
*G06F 9/445* (2018.01)
*G06F 8/656* (2018.01)
*G06F 11/34* (2006.01)
*G06F 11/30* (2006.01)

(52) U.S. Cl.
CPC .......... *G06F 9/44505* (2013.01); *G06F 8/656* (2018.02); *G06F 11/302* (2013.01); *G06F 11/3428* (2013.01)

(58) Field of Classification Search
CPC .... G06F 9/44505; G06F 8/656; G06F 11/302; G06F 11/3428
USPC ................ 717/140–151, 168–174
See application file for complete search history.

(56) References Cited

U.S. PATENT DOCUMENTS

| | | | |
|---|---|---|---|
| 5,768,500 A * | 6/1998 | Agrawal | G06F 11/348 717/130 |
| 6,189,142 B1 * | 2/2001 | Johnston | G06F 11/3466 714/39 |
| 6,230,312 B1 * | 5/2001 | Hunt | G06F 9/465 719/331 |
| 6,460,107 B1 * | 10/2002 | Rao | G06F 11/3409 710/305 |
| 7,237,242 B2 | 6/2007 | Blythe et al. | |
| 7,331,049 B1 * | 2/2008 | Jin | G06Q 10/107 709/201 |

(Continued)

FOREIGN PATENT DOCUMENTS

| | | |
|---|---|---|
| CN | 103810048 B | 1/2017 |
| CN | 111752708 A | 10/2020 |

OTHER PUBLICATIONS

Ahmed et al, "Studying the Effectiveness of Application Performance Management (APM) Tools for Detecting Performance Regressions for Web Applications: An Experience Report", IEEE, pp. 1-12 (Year: 2016).*

(Continued)

*Primary Examiner* — Anil Khatri

(57) ABSTRACT

According to examples, an apparatus may include a processor and a memory on which are stored machine-readable instructions that when executed by the processor, may cause the processor to receive information regarding a performance characteristic of an application during predetermined time periods. The processor may calculate a rate of change in the performance characteristic over the predetermined time periods. Based on a determination that the performance characteristic of the application has changed over the predetermined time periods, the processor may tune values of a set of parameters for the application based on the calculated rate of change in the performance characteristic.

20 Claims, 5 Drawing Sheets

(56) References Cited

U.S. PATENT DOCUMENTS

| | | | | |
|---|---|---|---|---|
| 7,406,686 | B2* | 7/2008 | Liu | G06F 11/3612 |
| | | | | 717/127 |
| 7,630,802 | B2* | 12/2009 | Breed | G07C 5/085 |
| | | | | 701/31.9 |
| 7,870,438 | B2* | 1/2011 | Bartik | G06F 11/3476 |
| | | | | 717/124 |
| 7,984,429 | B2* | 7/2011 | Hunt | G06F 9/465 |
| | | | | 717/130 |
| 7,996,814 | B1* | 8/2011 | Qureshi | G06N 5/048 |
| | | | | 717/172 |
| 8,185,906 | B2 | 5/2012 | Muscarella | |
| 8,219,987 | B1* | 7/2012 | Vlaovic | G06F 9/448 |
| | | | | 718/1 |
| 8,677,360 | B2 | 3/2014 | de Justo Teixeira et al. | |
| 8,874,801 | B1* | 10/2014 | Ramineni | G06F 13/20 |
| | | | | 710/72 |
| 10,019,271 | B2* | 7/2018 | Hsiao | G06F 11/3024 |
| 10,402,220 | B2 | 9/2019 | Gleyzer et al. | |
| 10,708,654 | B1* | 7/2020 | Moraghan | H04N 21/2547 |
| 10,756,995 | B2* | 8/2020 | Schibler | H04L 43/08 |
| 11,144,428 | B2* | 10/2021 | Abe | G06F 9/3004 |
| 11,256,590 | B1* | 2/2022 | Hulick, Jr. | G06F 11/302 |

OTHER PUBLICATIONS

Siracusa et al, "A CAD-based methodology to optimize HLS code via the Roofline model", ACM, pp. 1-9 (Year: 2020).*

Felber et al, "Dynamic Performance Tuning of Word-Based Software Transactional Memory", ACM, pp. 237-245 (Year: 2008).*

Chen et al, "Multi-objectivizing Software Configuration Tuning", ACM, pp. 453-465 (Year: 2021).*

Browne et al, "A Scalable Cross-Platform Infrastructure for Application Performance Tuning Using Hardware Counters", IEEE, pp. 1-13 (Year: 2000).*

Johnston et al, "Performance Analysis of a Dynamic Programming Track Before Detect Algorithm", IEEE, pp. 228-242 (Year: 2002).*

Tao Ju, et al.; "Energy-Efficient Thread Mapping for Heterogeneous Many-Core Systems via Dynamically Adjusting the Thread Count"; Apr. 8, 2019; (20 pages).

Nitish Agarwal et al.; "Performance Prediction for Multi-Threaded Applications"; New York University; (6 pages).

Tao Ju, et al.; "Thread Count Prediction Model: Dynamically Adjusting Threads for Heterogeneous Many-Core Systems"; Dec. 17, 2015; (9 pages).

\* cited by examiner

APPLICATION TUNING BASED ON PERFORMANCE CHARACTERISTICS

BACKGROUND

Applications may have a plurality of parameters that may control performance of the applications. The parameters may be tuned to optimize performance of the applications.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
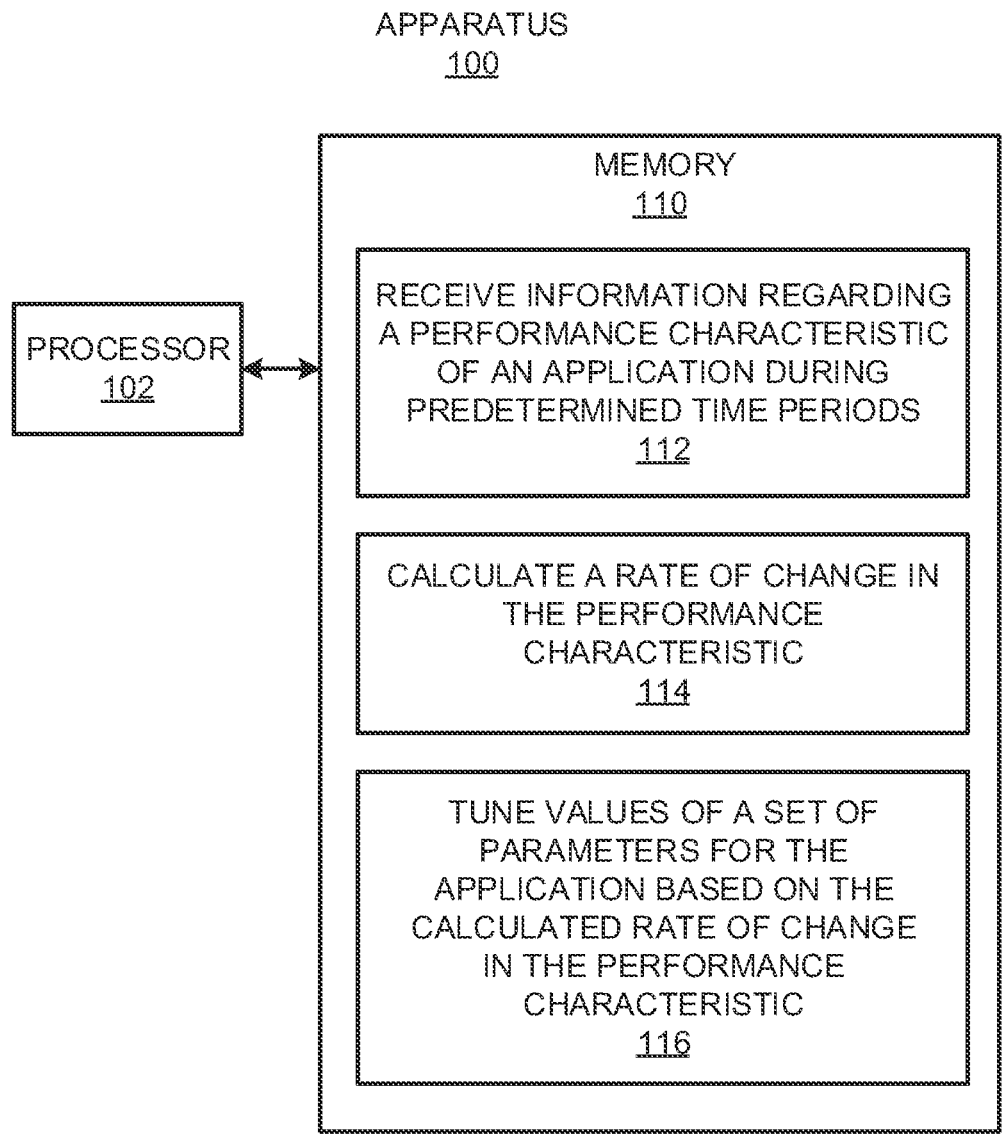
FIG. 1 shows a block diagram of an example apparatus that may receive information regarding a performance characteristic of an application, calculate a rate of change in the performance characteristic, and tune values of a set of parameters for the application based on the calculated rate of change in the performance characteristic.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Generally, applications may provide a rich set of customization parameters, which an administrator may manually tune. In many instances, a significant number of performance-related issues may be resolved by changing one or more parameter values for the application. In order to tune the parameters, a user may consult with an administrator to identify the parameter and their values, manually configure them to new values, observe the resulting performance to determine if further tuning is required, and in some cases, perform a system restart for the changes to take effect, which may increase downtime of the application.

Disclosed herein are methods, apparatuses, and computer-readable mediums that may allow for parameters of an application to be auto-tuned by self-learning. In some examples, a processor may dynamically tune values of a set of parameters based on monitored performance characteristics of the application. In these examples, the processor may receive information regarding a performance characteristic of the application during predetermined time periods. By way of particular examples and for purposes of illustration, the information regarding the performance characteristic may be related to a number of caching events. In this example, a trend in the number of caching events may be indicative of performance issues, particularly in an optimal number of threads that may be allocated to the application. For instance, a relatively large increase in the number of caching events may be indicative of insufficient number of threads to process the events. Alternatively, a relatively large decrease in the number of caching events may indicate that there may be more threads allocated to process the events than may be needed. In this manner, the processor may detect performance characteristics of the application to self-learn conditions of the application, and may tune a set of parameters of the application. In some examples, the processor may calculate a rate of change in the performance characteristic over predetermined time periods, and based on a determination that the performance characteristic of the application has changed over the predetermined time periods, the processor may tune values for the set of parameters for the application based on the rate of change of the performance characteristic.

By enabling a processor to dynamically tune a set of parameters for an application, a mean time to repair (MTTR) may be improved by avoiding manual efforts and downtime by automatically tuning the parameters leading to greater efficiency levels. Automated tuning may also reduce potential delays and human errors associated with manual tuning of application parameters, thereby reducing downtime and reducing potential loss of security events. The implementation of the features of the present disclosure may also enhance efficiency of the processor based on tuning of the set of parameters, thereby reducing consumption of energy and computing resources by the processor.

Figure 2:
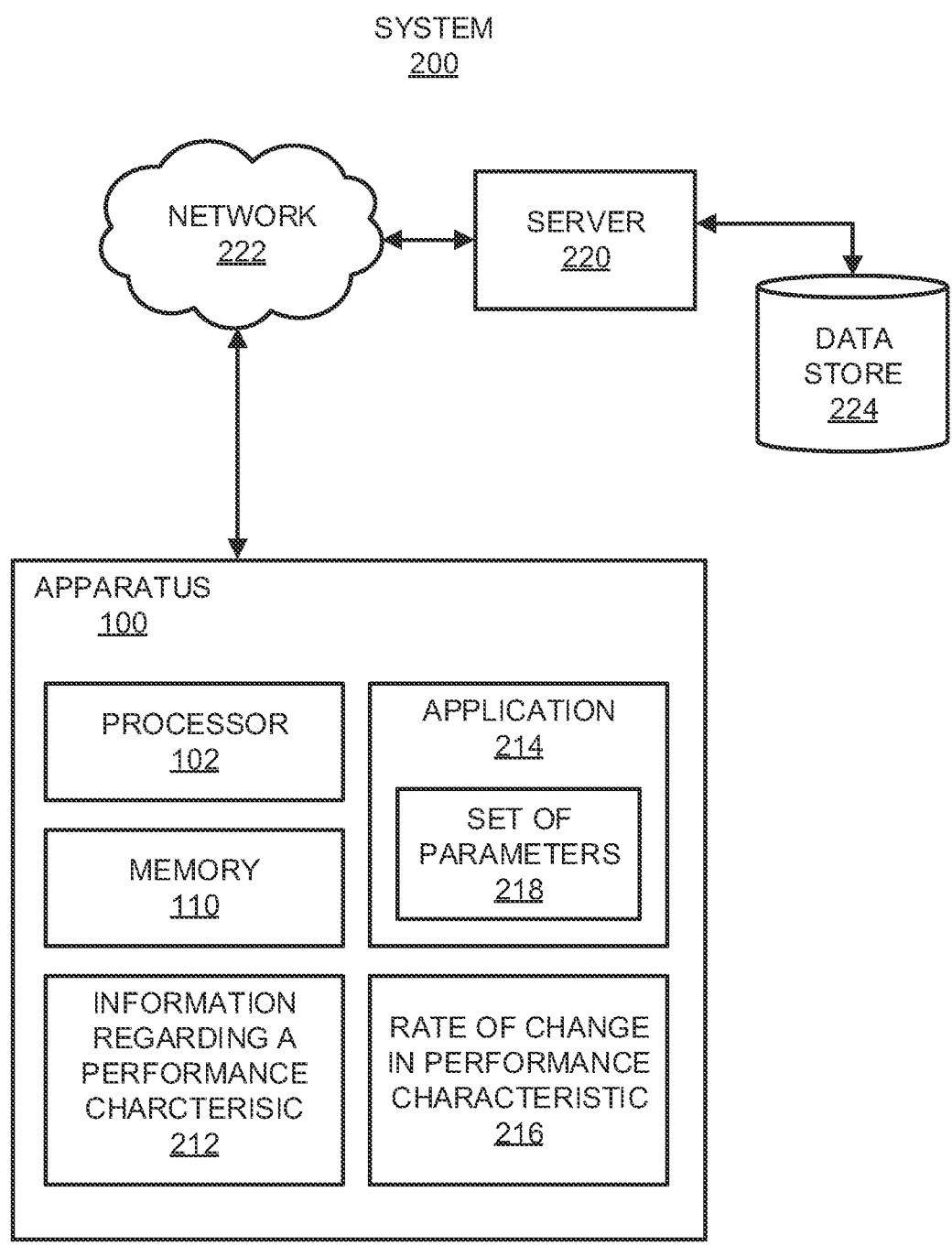
FIG. 2 shows a block diagram of an example system in which the example apparatus depicted in FIG. 1 may be implemented.
Figure 3A:
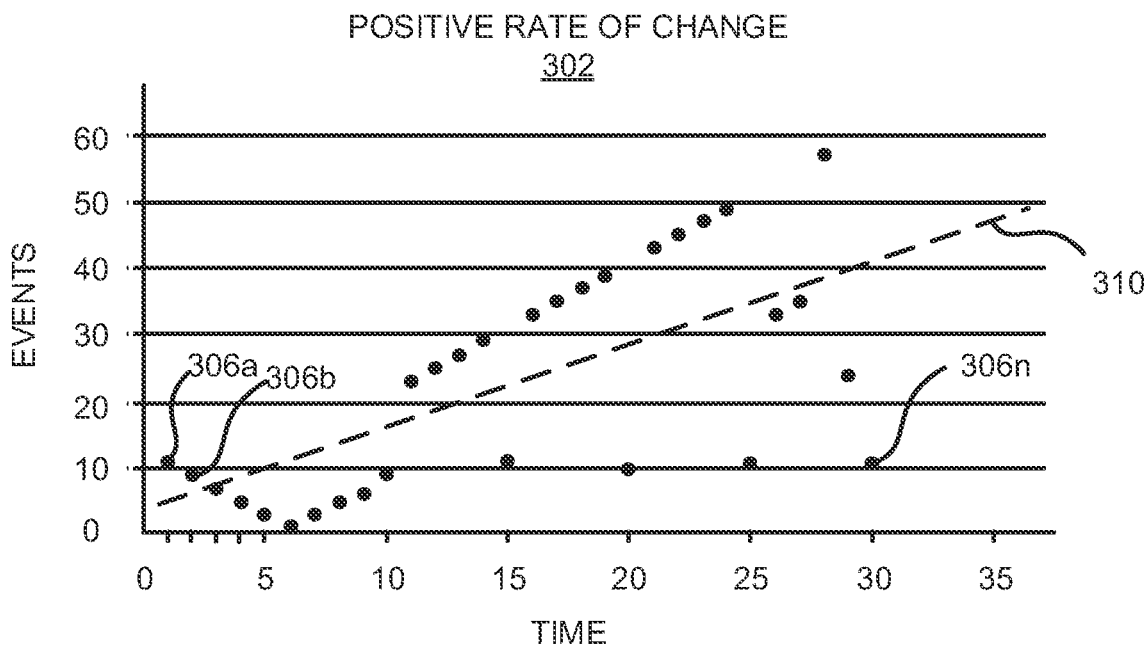
FIGS. 3A and 3B depict graphs of example occurrences of events of an application and example lines that represent rates of change in the occurrence of the events of the application.
Figure 3B:
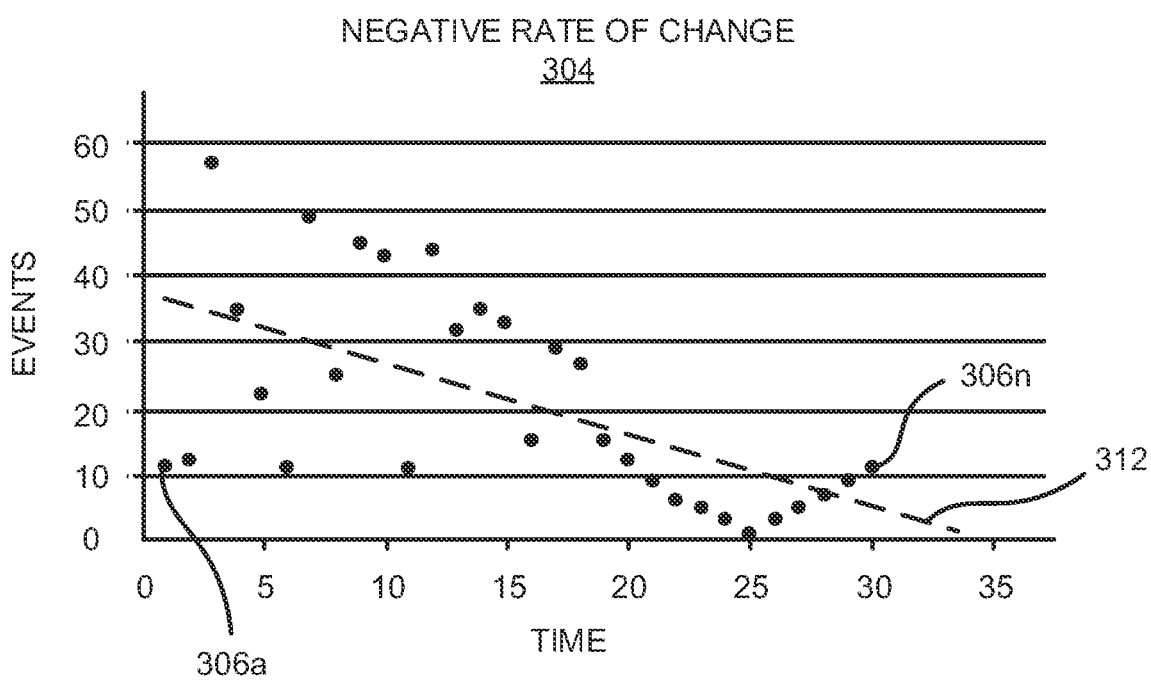

Reference is made to FIGS. 1, 2, 3A and 3B. FIG. 1 shows a block diagram of an example apparatus 100 that may receive information regarding a performance characteristic of an application, calculate a rate of change in the performance characteristic, and tune values of a set of parameters for the application based on the calculated rate of change in the performance characteristic. FIG. 2 shows a block diagram of an example system 200 in which the example apparatus 100 depicted in FIG. 1 may be implemented. FIGS. 3A and 3B depict graphs 302 and 304 of example occurrences of events of an application and example lines that represent rates of change in the occurrence of the events of the application. It should be understood that the example apparatus 100 depicted in FIG. 1, the example system 200 depicted in FIG. 2, and the example graphs 302 and 304 depicted in FIGS. 3A and 3B may include additional features and that some of the features described herein may be removed and/or modified without departing from the scopes of the apparatus 100, the system 200, and/or the graphs 302 and 304.

The apparatus 100 may be a server (such as a management server), a node in a network (such as a data center), a personal computer, a laptop computer, a tablet computer, a smartphone, and/or the like. As shown, the apparatus 100 may include a processor 102 and a memory 110, e.g., a non-transitory computer-readable medium. In some examples, the apparatus 100 may be a management server in a cloud-based management platform that has stored thereon instructions that may cause the processor 102 to auto-tune parameters of application programs residing on the apparatus 100. As used herein, the terms auto-tune or self-tune may refer to systems in which the system itself may be implemented to optimize internal running parameters in order to maximize efficiency or minimize errors, for instance, without user or administrator intervention.

The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Erasable Programmable Read-Only Memory (EPROM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown, the memory 110 may have stored thereon instructions 112-116 that the processor 102 may fetch, decode, and execute. Particularly, the processor 102 may execute the instructions 112-116 to tune values of a set of parameters for an application 214. The instructions 112-116 may be non-transitory machine-readable instructions (or equivalently, non-transitory computer-readable instructions).

The processor 102 may fetch, decode, and execute the instructions 112 to receive information 212 regarding a performance characteristic of an application 214 during predetermined time periods. By way of particular example and for purposes of illustration, the information 212 regarding the performance characteristic is described herein as being information regarding a number of events that are cached during predetermined time periods, also referred to herein as caching events of an application 214. It should be understood, however, that the information 212 regarding the performance characteristic may include various types of information regarding performance trends of the application 214. In some examples, the information 212 regarding the performance characteristic may include information regarding an amount of time to load content, such as, web pages, information regarding temporary file sizes that are allocated, a rate of incoming events, CPU usage, cache utilization percentage, and/or other types of performance characteristics that may represent symptoms of the application 214, which may be associated with degraded performance of the application 214. In some examples, information 212 regarding the performance characteristic may include information for a combination of different performance characteristics, such as a combination of memory utilization and CPU utilization, and/or the like. The information 212 regarding the performance characteristic, which may be detected by the processor 102 and associated with certain parameters of the application 214, may be user-defined, based on testing, modeling, simulations, and/or the like.

The processor 102 may fetch, decode, and execute the instructions 114 to calculate a rate of change 216 in the performance characteristic over the predetermined time periods. In some examples, the information 212 regarding the performance characteristic may be associated with an event occurring in the application 214, and the processor 102 may calculate the rate of change 216 in the occurrence of the event in the application 214.

Continuing with the example in which the event is a caching event of the application 214, the information 212 may include event counts for the caching events. In this regard, the processor 102 may cache events of the application 214 in cases where resources allocated to the application 214 for processing the event may be limited. As such, a trend in which the processor 102 increases the number of caching events may indicate that there may be insufficient allocated resources, such as an insufficient number of threads to process the events. Alternatively or additionally, a trend in which the processor 102 decreases the number of caching events may indicate that there may be more threads allocated to process the events than may be optimal. In some examples, the processor 102 may compare the change in the number of caching events to predetermined thresholds to identify presence of trends for the events. The predetermined thresholds may be user-defined, based on historical data, experimentation, modeling, and/or the like.

Referring now to FIGS. 3A and 3B, the processor 102 may monitor the application 214 to detect events associated with the application 214, such as caching events for the application 214, and/or the like. In this example, the processor 102 may maintain an event count at predetermined time periods. For instance, at each instance of a caching event, the processor 102 may record the event along with a timestamp. At each of the predetermined time periods, such as at 1 minute, 2 minute, 5 minute, etc., time intervals, the processor 102 may record an event count of the events occurring during that predetermined time period. For example, as depicted in FIG. 3A, at the 1 minute mark, the processor 102 may record an event count 306*a* representing 11 events occurring during the first minute, at the 2 minute mark, the processor 102 may record an event count 306*b* representing 9 events occurring during the second minute, and so on.

The processor 102 may calculate the rate of change 216 in the performance characteristic based on the changes in the event counts for the event occurring in the application 214 among the predetermined time periods, such as event counts 306*a* to 306*n*. By way of particular example and for purposes of illustration, the processor 102 may calculate the rate of change 216 as a linear regression-based line, such as depicted by line 310 in FIG. 3A. It should be understood that, while the rate of change 216 is described herein as being calculated using a linear regression model for purposes of description, the rate of change 216 may be calculated using other types of models.

The processor 102 may fetch, decode, and execute the instructions 116 to tune values of a set of parameters 218 for the application 214 based on the calculated rate of change 216 in the performance characteristic. The processor 102 may tune the values of the set of parameters 218 based on a determination that the performance characteristic of the application 214 has changed over the predetermined time periods. The processor 102 may execute the application 214 based on the tuned values of the set of parameters 218 for the application 214.

In some examples, the processor 102 may increase or decrease the values of the set of parameters 218 for the application 214 in proportion to the calculated rate of change 216 in the performance characteristic based on changes in the event counts 306a to 306n for the event occurring in the application 214 among the predetermined time periods. In some examples, based on the calculated rate of change 216 being an increase in the rate of change in the performance characteristic, for instance as depicted by the positively sloped line 310, the processor 102 may increase the values of the set of parameters 218 for the application 214 in proportion to the increase in the rate of change 216 in the performance characteristic. In this regard, a relatively greater positive slope of the line 310 or a value of the rate of change 216 may correlate with a greater increase in the values of the set of parameters 218.

By way of particular example and for purposes of illustration, the information 212 regarding a performance characteristic of the application 214 may be memory utilization and the set of parameters 218 may be memory allocation. In some examples, the processor 102 may tune the memory allocation value in proportion to a rate of incoming events. For instance, the event may be memory utilization exceeding a predetermined threshold, such as 90% memory utilization. When two occurrences of the memory utilization event are detected 5 minutes apart, the processor 102 may tune the value for memory allocation to increase by 10%, and when two occurrences of the memory utilization event are detected 2 minutes apart, the processor 102 may tune the value for memory allocation to be increased by 30%.

In some examples, based on the calculated rate of change 216 being a decrease in the rate of change 216 in the performance characteristic, for instance as depicted by the negatively sloped line 312 in FIG. 3B, the processor 102 may decrease the values of the set of parameters 218 for the application 214 in proportion to the decrease in the rate of change 216 in the performance characteristic. In this regard, a relatively greater negative slope of the line 312 or value of the rate of change 216 may correlate with a greater decrease in the values of the set of parameters 218. The amount of change in the set of parameters 218 correlating to the calculated rate of change 216 may be user-defined, and may be determined based on testing, modeling, simulations, and/or the like.

In some examples, the set of parameters 218 for the application 214 may include a number of threads for the application, a size of a memory allocated for the application 214, a batch size, a batch timeout, CPU allocation, a size of cache allocated, a number of web servers allocated, and/or the like. It should be understood that, while for purposes of description the set of parameters 218 for the application 214 is described herein as including the number of threads and the size of the memory allocated, the set of parameters 218 for the application 214 may include various types and/or groups of parameters for the application 214.

In some examples, the processor 102 may calculate the rate of change 216 in the number of events that are cached during each of the predetermined time periods, and may change a set of parameters 218, such as the number of threads for the application 214, the size of memory allocated for the application 214, and/or the like, or a combination thereof, based on the calculated rate of change 216 in the number of events that are cached during each of the predetermined time periods. In some examples, the processor 102 may change the set of parameters 218 by an amount in proportion to the value of the rate of change 216 in the performance characteristic.

In some examples, in response to the values of the set of parameters 218 for the application 214 being tuned, the processor 102 may continue to monitor the application 214 and may tune additional and/or different parameters of the application 214. By way of particular example and for purposes of illustration, the processor 102 may detect that the change in the set of parameters 218, such as that based on the positive rate of change 216 depicted by the line 310 as described above, has not resulted in a desired or expected change in the performance of the application 214. In such instances, the processor 102 may receive second information regarding the performance characteristic of the application 214 and may calculate a second rate of change in the performance characteristic. In some examples, based on the calculated second rate of change in the performance characteristic being the same as the rate of change 216 in the performance characteristic, the processor 102 may tune values for a second set of parameters for the application 214 in proportion to the second rate of change in the performance characteristic. The second set of parameters for the application 214 may be a different set of parameters than the set of parameters 218 for the application 214 that were previously updated.

In some examples, the second information may include one or more than one of caching events, an amount of time to load content such as web pages, information regarding temporary file sizes that are allocated, a rate of incoming events, CPU usage, cache utilization percentage, and/or other types of performance characteristics that may represent symptoms of the application 214, which may be associated with degraded performance of the application 214. The second set of parameters for the application 214 may include one or more than one of a number of threads for the application, a size of a memory allocated for the application 214, a batch size, a batch timeout, CPU allocation, a size of cache allocated, a number of web servers allocated, and/or the like.

By way of particular example and for purposes of illustration, in a case where the processor 102 may detect that change in the set of parameters 218, such as an increase in thread counts, has not resulted in a desired or expected change in the performance of the application 214, the processor 102 may change a second set of parameters, such as a size of a memory allocated for the application 214, a batch size, a batch timeout, CPU allocation, a size of cache allocated, a number of web servers allocated, and/or the like, based on a second set of events. In some examples, in response to a determination that memory utilization remains relatively high, but CPU utilization is within predetermined thresholds, the processor 102 may increase a value for batch size, batch timeout, memory allocation, thread count, and/or the like.

In some examples, the processor 102 may determine whether the set of parameters 218 are parameters for which updates may be applied without an application restart, or parameters for which updates may be applied after an application restart. An indication for whether the set of parameters 218 for the application 214 is a type that may require an application restart or a type that may not require an application restart may be user-defined, based on prior knowledge, known application capabilities, testing, modeling, simulations, and/or the like.

The processor 102 may apply the tuned values of the set of parameters 218 for the application 214 without an application restart based on a determination that the set of parameters 218 does not require an application restart to apply the changes to the set of parameters 218 for the application 214. In some examples, based on a determination that the set of parameters 218 for the application 214 may require an application restart to apply changes to the value of the set of parameters 218 for the application 214, the processor 102 may change the values of the set of parameters 218 in a configuration file (not shown) associated with the set of parameters 218 for the application 214 and may output a notification (not shown) to restart the application 214.

In some examples, the application 214 may be stored and executed on another apparatus, such as a server 220 or a group of servers 220 on a network 222. In these instances, the information 212 regarding the performance characteristic of the application 214 may be distributed among multiple servers 220. In some examples, the server 220 may include a data store 224 that may store the application 214 and/or the information 212 regarding the performance characteristic of the application 214. In some examples, the application 214 may be executed on virtual machines hosted on one or more of the servers 220.

Figure 4:
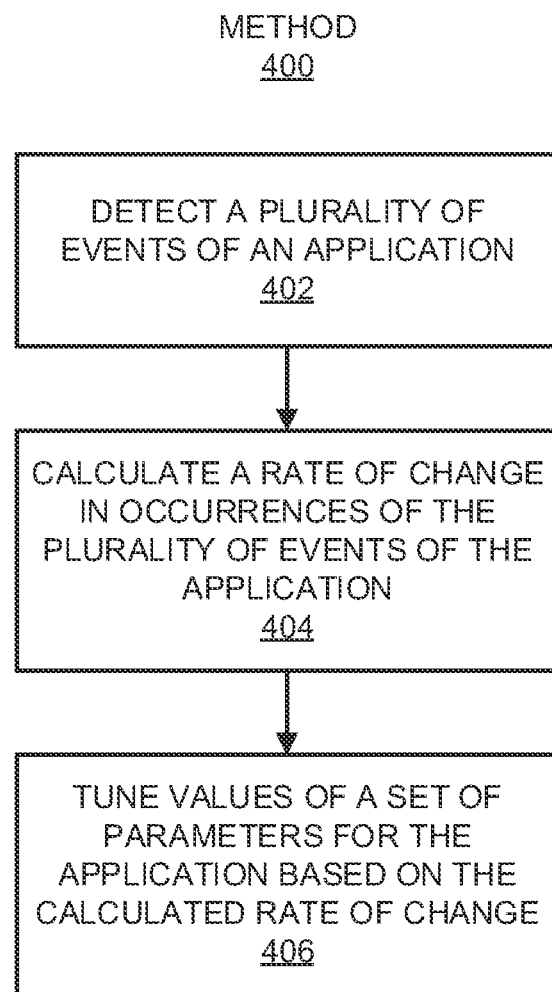
FIG. 4 shows a flow diagram of an example method for calculating a rate of change in occurrences of a plurality of events of an application and tuning values of a set of parameters for the application based on the calculated rate of change.

Various manners in which the processor 102 may operate are discussed in greater detail with respect to the method 400 depicted in FIG. 4. FIG. 4 depicts a flow diagram of an example method 400 for calculating a rate of change 216 in occurrences of a plurality of events of an application 214 and tuning values of a set of parameters 218 for the application 214 based on the calculated rate of change 216. It should be understood that the method 400 depicted in FIG. 4 may include additional operations and that some of the operations described therein may be removed and/or modified without departing from the scope of the method 400. The description of the method 400 is made with reference to the features depicted in FIGS. 1, 2, 3A and 3B for purposes of illustration.

At block 402, the processor 102 may detect a plurality of events of an application, such as the application 214 depicted in FIG. 2. The plurality of events of the application 214 may be associated with a performance characteristic of the application 214.

At block 404, the processor 102 may calculate a rate of change in occurrences of the plurality of events of the application 214, such as the rate of change 216 depicted in FIG. 2. The rate of change may be a rate in which a number of occurrences of the plurality of events may increase or decrease over predetermined time periods.

At block 406, the processor 102 may tune values of a set of parameters, such as the set of parameters 218 depicted in FIG. 2, for the application 214 based on the calculated rate of change 216 in occurrences of the plurality of events of the application 214. In some examples, the processor 102 may tune the values of the set of parameters 218 in proportion to the calculated the rate of change 216 in occurrences of the plurality of events of the application 214. The processor 102 may execute the application 214 based on the tuned values of the set of parameters 218 for the application 214.

In some examples, the processor 102 may maintain event counts, such as the event counts 306a to 306n depicted in FIGS. 3A and 3B, for the plurality of events of the application 214 for the predetermined time periods. The processor 102 may calculate the rate of change 216 in occurrences of the plurality of events of the application 214 based on changes in the event counts 306a to 306n for the plurality of events of the application 214 over the predetermined time periods. The processor 102 may increase or decrease the values of the set of parameters 218 for the application 214 in proportion to the calculated rate of change 216, such as that depicted by lines 310 or 312 in FIGS. 3A and 3B, in occurrences of the plurality of events of the application 214.

In some examples, based on the calculated rate of change 216 being an increase in the rate of change 216 in occurrences of the plurality of events of the application 214, the processor 102 may increase the values of the set of parameters 218 for the application 214 in proportion to the increase in the rate of change 216 in occurrences of the plurality of events of the application 214. In some examples, based on the calculated rate of change 216 being a decrease in the rate of change 216 in occurrences of the plurality of events of the application 214, the processor 102 may decrease the values of the set of parameters 218 for the application 214 in proportion to the decrease in the rate of change 216 in occurrences of the plurality of events of the application 214. In some examples, the processor 102 may increase the values of the set of parameters 218 based on a decrease in the rate of change 216, and vice versa, based on a predetermined relationship that is set between the set of parameters 218 and the calculated rate of change 216.

In some examples, in response to the values of the set of parameters 218 for the application 214 being tuned as described previously, the processor 102 may detect a second plurality of events of the application 214. The processor 102 may calculate a second rate of change in occurrences of the second plurality of events of the application, and may determine whether the second rate of change in occurrences of the second plurality of events is different than the rate of change 216 in occurrences of the plurality of events of the application 214. Based on a determination that the second rate of change in occurrences of the second plurality of events of the application is the same as the rate of change in occurrences of the plurality of events of the application, the processor 102 may tune values for a second set of parameters for the application 214 in proportion to the second rate of change in occurrences of the plurality of events of the application 214. In some examples, the second plurality of events of the application 214, the second rate of change, and the second set of parameters of the application 214 may be subsequent events and may be similar to the rate of change 216 and the set of parameters 218, as previously described. In this example, the second set of parameters for the 214 may be a different set of parameters as compared to the previously tuned set of parameters 218 for the application 214.

In some examples, the second plurality of events may include one or more than one of caching events, an amount of time to load content such as web pages, information regarding temporary file sizes that are allocated, a rate of incoming events, a CPU usage value, cache utilization percentage, and/or other types of performance characteristics that may represent symptoms of the application 214, which may be associated with degraded performance of the application 214. The second set of parameters for the application 214 may include one or more than one of a number of threads for the application, a size of a memory allocated for the application 214, a batch size, a batch timeout, CPU allocation, a size of cache allocated, a number of web servers allocated, and/or the like.

By way of particular example and for purposes of illustration, in a case where the processor 102 may detect that change in the set of parameters 218, such as an increase in thread counts, has not resulted in a desired or expected change in the performance of the application 214, the processor 102 may change a second set of parameters, such as a size of a memory allocated for the application 214, a batch size, a batch timeout, CPU allocation, a size of cache allocated, a number of web servers allocated, and/or the like, based on a second set of events. In some examples, in response to a determination that memory utilization remains relatively high, but CPU utilization is within predetermined thresholds, the processor 102 may increase a value for batch size, batch timeout, memory allocation, thread count, and/or the like.

In some examples, the processor 102 may determine whether the set of parameters 218 are parameters that may require an application restart to apply changes to the set of parameters 218 for the application 214. In cases in which updates to the set of parameters 218 may be applied without an application restart, the processor 102 may apply the tuned values for the set of parameters 218 for the application 214 without first restarting the application 214. In some examples, based on a determination that the set of parameters 218 for the application 214 requires an application restart to apply changes to the set of parameters 218 for the application 214, the processor may change the values of the set of parameters 218 for the application 214 in a configuration file (not shown) associated with the set of parameters 218 for the application 214 and may output a notification (not shown) to restart the application 214.

In some examples, the plurality of events of the application 214, such as the events 306a to 306n, may include caching events during predetermined time periods, and the set of parameters 218 for the application 214 may include a number of threads for the application, a size of memory allocated for the application, and/or the like, or a combination thereof. The processor 102 may calculate the rate of change 216 in occurrences of the plurality of events of the application 214 based on changes in a number of the caching events during each of the predetermined time periods, such as the increasing or decreasing rate of change 216 of respective lines 310 and 312, which may be calculated based on the caching events 306a to 306n depicted in FIGS. 3A and 3B. The processor 102 may change the number of threads for the application 214, the size of memory allocated for the application 214, and/or the like, or a combination thereof, in proportion to the rate of change in occurrences of the plurality of events of the application 214.

In some examples, based on a determination that the rate of change 216 in occurrences of the plurality of events of the application 214 may be increasing by a first rate, the processor 102 may increase a level of a parameter among the set of parameters 218 by a first amount that may correlate to the first rate. Based on a determination that the rate of change 216 in occurrences of the plurality of events of the application 214 may be increasing by a second rate that is greater than the first rate, the processor 102 may increase the level of the parameter 218 among the set of parameters by a second amount that correlates to the second rate.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic apparatus capable of executing the above-described functions may perform those functions enumerated above.

Figure 5:
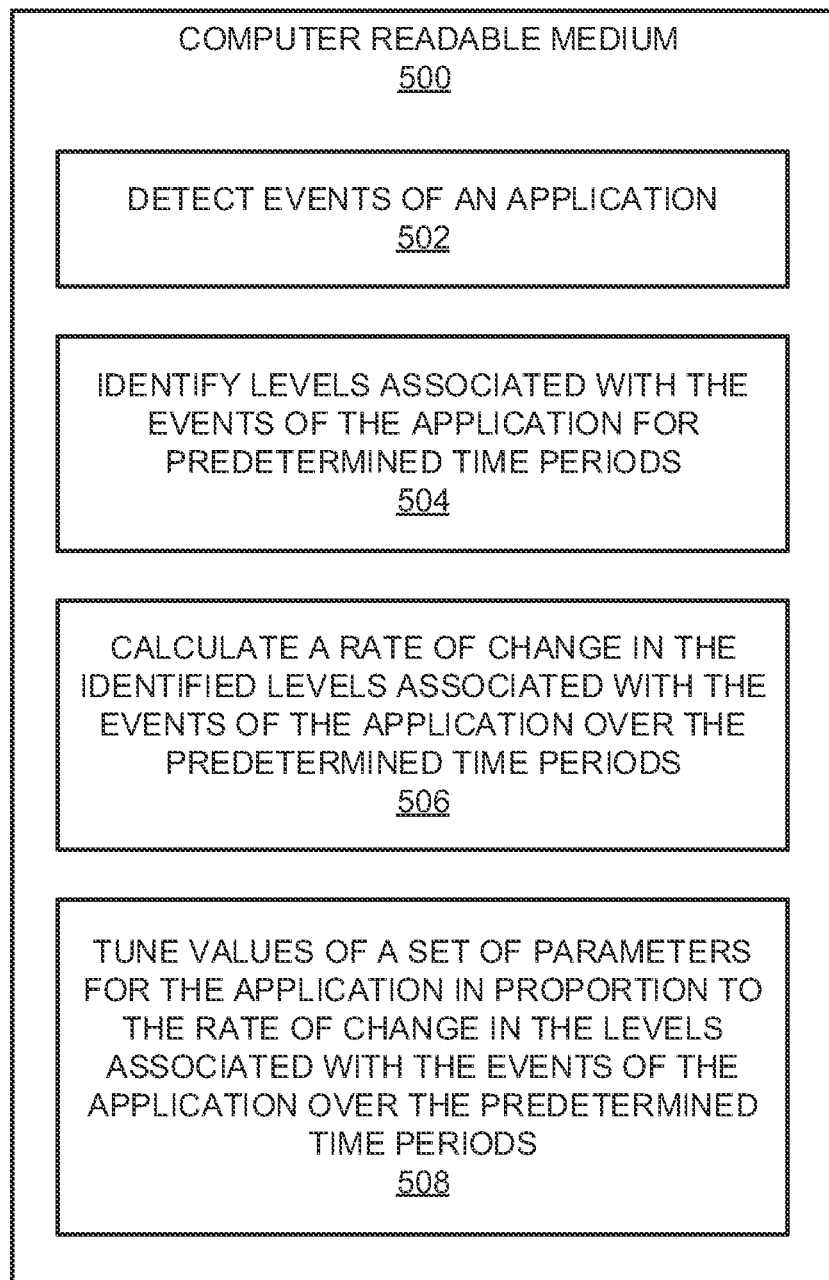
FIG. 5 shows a block diagram of an example non-transitory computer-readable medium that may have stored thereon machine readable instructions to detect events of an application, calculate a rate of change in levels associated with the events of the application, and tune values of a set of parameters for the application in proportion to the calculated rate of change in the levels associated with the events of the application.

Turning now to FIG. 5, there is shown a block diagram of an example non-transitory computer-readable medium 500 that may have stored thereon machine readable instructions to detect events of an application, calculate a rate of change in levels associated with the events of the application, and tune values of a set of parameters for the application in proportion to the calculated rate of change in the levels associated with the events of the application. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium. The term "non-transitory" does not encompass transitory propagating signals. The description of the non-transitory computer-readable medium 500 is also made with reference to the features depicted in FIGS. 1, 2, 3A and 3B for purposes of illustration. Particularly, the processor 102 of the apparatus 100 may execute some or all of the instructions 502-508 included in the non-transitory computer-readable medium 500.

The computer-readable medium 500 may have stored thereon machine-readable instructions 502-508 that a processor, such as the processor 102 depicted in FIGS. 1 and 2, may execute. The computer-readable medium 500 may be an electronic, magnetic, optical, or other physical storage device that contains or stores executable instructions. The computer-readable medium 500 may be, for example, RAM, EEPROM, a storage device, an optical disc, or the like.

The processor may fetch, decode, and execute the instructions 502 to detect events of an application, such as the application 214 depicted in FIG. 2. The events may be associated with a performance characteristic of the application 214. The processor may fetch, decode, and execute the instructions 504 to identify levels associated with the events of the application 214 for predetermined time periods.

The processor may fetch, decode, and execute the instructions 506 to calculate a rate of change in the identified levels associated with the events of the application 214, such as the rate of change 216 depicted in FIG. 2, over the predetermined time periods. The processor may fetch, decode, and execute the instructions 508 to tune values of a set of parameters for the application 214, such as the parameters 218 depicted in FIG. 2, in proportion to the rate of change 216 in the levels associated with the events of the application 214 over the predetermined time periods. The processor may execute the application 214 based on the tuned values of the set of parameters 218 for the application 214.

In some examples, based on an increase in the rate of change 216 in the levels associated with the events of the application 214, the processor may increase the values for the set of parameters 218 for the application 214 in proportion to the increase in the rate of change 216 in the levels associated with the events of the application 214. In some examples, based on a decrease in the rate of change 216 in the levels associated with the events of the application 214, the processor 102 may decrease the values for the set of parameters 218 for the application 214 in proportion to the decrease in the rate of change in the levels associated with the events of the application 214.

In some examples, in response to the values for the set of parameters 218 for the application 214 being tuned, the processor may detect second events of the application 214. The second events may be associated with the performance characteristic of the application 214. In this regard, the performance characteristics associated with the second events may be the same as or different than the previously monitored performance characteristics associated with the rate of change 216. The processor may calculate a second rate of change in levels associated with the second events of the application. Based on the second rate of change in the levels associated with the second events of the application 214 being the same as the rate of change 216 in the levels associated with the events of the application 214, the processor may tune values of a second set of parameters for the application 214 in proportion to the second rate of change in the levels associated with the second events of the application 214. In some examples, the second set of parameters for the application 214 may be different than the set of parameters 218 for the application 214.

In some examples, the second information may include one or more than one of caching events, an amount of time to load content such as web pages, information regarding temporary file sizes that are allocated, a rate of incoming events, CPU usage, cache utilization percentage, and/or other types of performance characteristics that may represent symptoms of the application 214, which may be associated with degraded performance of the application 214. The second set of parameters for the application 214 may include one or more than one of a number of threads for the application, a size of a memory allocated for the application 214, a batch size, a batch timeout, CPU allocation, a size of cache allocated, a number of web servers allocated, and/or the like.

By way of particular example and for purposes of illustration, in a case where the processor may detect that change in the set of parameters 218, such as an increase in thread counts, has not resulted in a desired or expected change in the performance of the application 214, the processor may change a second set of parameters, such as a size of a memory allocated for the application 214, a batch size, a batch timeout, CPU allocation, a size of cache allocated, a number of web servers allocated, and/or the like, based on a second set of events. In some examples, in response to a determination that memory utilization remains relatively high, but CPU utilization is within predetermined thresholds, the processor may increase a value for batch size, batch timeout, memory allocation, thread count, and/or the like.

In some examples, based on a determination that the set of parameters for the application 214 does not require an application restart to apply changes to the set of parameters 218 for the application 214, the processor may apply the tuned values of the set of parameters 218 for the application 214 without the application restart. In some examples, based on a determination that the set of parameters 218 for the application 214 requires the application restart to apply changes to the set of parameters 218 for the application 214, the processor may change the values for the set of parameters 218 in a configuration file (not shown) associated with the set of parameters 218 for the application 214, and may output a notification (not shown) to restart the application 214.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. An apparatus comprising:
   a processor; and
   a memory on which are stored machine-readable instructions that when executed by the processor, cause the processor to:
   receive information regarding a performance characteristic of an application during predetermined time periods, the performance characteristic being associated with a number of occurrences of an event of the application;
   maintain event counts comprising the number of occurrences of the event of the application during each of the predetermined time periods;
   calculate a rate of change in the maintained event counts over the predetermined time periods; and
   based on a determination that the calculated rate of change in the maintained event counts associated with the performance characteristic of the application has decreased over the predetermined time periods,
   tune values of a set of parameters for the application by decreasing the values of the set of parameters for the application in proportion to a decrease in the calculated rate of change in the maintained event counts associated with the performance characteristic,
   wherein the application is executed based on the tuned values of the set of parameters for the application.

2. The apparatus of claim 1, wherein the instructions cause the processor to:
   based on the tuned values of the set of parameters for the application, allocate resources correlated to the performance characteristic in proportion to the calculated rate of change in the event counts associated with the performance characteristic.

3. The apparatus of claim 1, wherein the instructions cause the processor to:
   maintain a first event count for a number of occurrences of the event in the application during a first time period among the predetermined time periods and a second event count for a number of occurrences of the event in the application during a second time period among the predetermined time periods;
   calculate the rate of change in the maintained event counts of the event occurring in the application over the predetermined time periods based on a change between the first event count for the number of occurrences of the event in the application during the first time period and the second event count for the number of occurrences of the event in the application during the second time period; and
   increase or decrease the values of the set of parameters for the application in proportion to the calculated rate of change in the maintained event counts of the event occurring in the application during the predetermined time periods based on the change between the first event count for the number of occurrences of the event in the application during the first time period and the second event count for the number of occurrences of the event in the application during the second time period.

4. The apparatus of claim 1, wherein the instructions cause the processor to:
  based on a determination that the calculated rate of change in the maintained event counts associated with the performance characteristic of the application has increased over the predetermined time periods, tune the values of the set of parameters for the application by increasing the values of the set of parameters for the application in proportion to the increase in the calculated rate of change in the maintained event counts associated with the performance characteristic.

5. The apparatus of claim 1, wherein the instructions cause the processor to:
  in response to the values of the set of parameters for the application being tuned, receive second information regarding the performance characteristic of the application;
  calculate a second rate of change in the event count associated with the performance characteristic; and
  based on the calculated second rate of change in the event count associated with the performance characteristic being the same as the calculated rate of change in the event count associated with the performance characteristic, tune values for a second set of parameters for the application in proportion to the calculated second rate of change in the event count associated with the performance characteristic, the second set of parameters for the application being different than the set of parameters for the application.

6. The apparatus of claim 1, wherein the instructions cause the processor to:
  apply the tuned values of the set of parameters for the application without an application restart.

7. The apparatus of claim 1, wherein the instructions cause the processor to:
  based on a determination that the set of parameters for the application requires an application restart to apply changes to the values of the set of parameters for the application,
    change the values of the set of parameters in a configuration file associated with the set of parameters for the application; and
    output a notification to restart the application.

8. The apparatus of claim 1, wherein the information regarding the performance characteristic includes information for a type of performance characteristic including a number of caching events during each of the predetermined time periods, an amount of time to load content, information regarding temporary file sizes that are allocated, a rate of incoming events, CPU usage, cache utilization percentage, or a combination thereof, and the set of parameters for the application includes a number of threads for the application, a size of memory allocated for the application, a batch size, a batch timeout value, CPU allocation, a size of cache allocated, a number of web servers allocated, or a combination thereof, and the instructions cause the processor to:
  calculate the rate of change in the maintained event counts associated with the type of performance characteristic during each of the predetermined time periods; and
  change the number of threads for the application, the size of memory allocated for the application, the batch size, the batch timeout value, the CPU allocation, the size of cache allocated, the number of web servers allocated, or a combination thereof, in proportion to the calculated rate of change in the maintained event counts associated with the type of performance characteristic during each of the predetermined time periods.

9. A method comprising:
  detecting, by a processor, a plurality of events of an application, a number of occurrences of the plurality of events of the application being associated with a performance characteristic of the application;
  maintaining, by the processor, event counts comprising the number of occurrences of the plurality of events of the application for predetermined time periods;
  calculating, by the processor, a rate of change in the maintained event counts of the number of occurrences of the plurality of events of the application; and
  based on a decrease in the calculated rate of change in the maintained event counts of the number of occurrences of the plurality of events of the application, tuning, by the processor, values of a set of parameters for the application by decreasing the values of the set of parameters for the application in proportion to the decrease in the calculated rate of change in the maintained event counts of the number of occurrences of the plurality of events of the application, wherein the application is executed based on the tuned values of the set of parameters for the application.

10. The method of claim 9, further comprising:
  maintaining a first event count for a first number of occurrences of the event in the application during a first time period and a second event count for a second number of occurrences of the event in the application during a second time period;
  calculating the rate of change in the number of occurrences of the plurality of events of the application based on a difference between the first event count for the first number of occurrences of the event in the application during the first time period and the second event count for the second number of occurrences of the event in the application during the second time period; and
  increasing or decreasing the values of the set of parameters for the application in proportion to the calculated rate of change in the number of occurrences of the plurality of events of the application based on the difference between the first event count for the first number of occurrences of the event in the application during the first time period and the second event count for the second number of occurrences of the event in the application during the second time period.

11. The method of claim 9, further comprising:
based on an increase in the calculated rate of change in the maintained event counts of the number of occurrences of the plurality of events of the application, tuning the values of the set of parameters for the application by increasing the values of the set of parameters for the application in proportion to the increase in the calculated rate of change in the maintained event counts of the number of occurrences of the plurality of events of the application.

12. The method of claim 9, further comprising:
in response to the values of the set of parameters for the application being tuned, detecting a second plurality of events of the application;
calculating a second rate of change in a number of occurrences of the second plurality of events of the application;
determining whether the calculated second rate of change in the number of occurrences of the second plurality of events is different than the calculated rate of change in the maintained event counts of the number of occurrences of the plurality of events of the application; and based on a determination that the calculated second rate of change in the number of occurrences of the second plurality of events of the application is the same as the calculated rate of change in the maintained event counts of the number of occurrences of the plurality of events of the application, tuning values for a second set of parameters for the application in proportion to the calculated second rate of change in the number of occurrences of the plurality of events of the application, the second set of parameters for the application being different than the set of parameters for the application.

13. The method of claim 9, further comprising:
applying the tuned values for the set of parameters for the application without first restarting the application.

14. The method of claim 9, further comprising:
based on a determination that the set of parameters for the application requires an application restart to apply changes to the set of parameters for the application, changing the values of the set of parameters for the application in a configuration file associated with the set of parameters for the application; and
outputting a notification to restart the application.

15. The method of claim 9, wherein detecting the plurality of events of the application includes detecting a type of the plurality of events including caching events during predetermined time periods, an amount of time to load content, temporary file sizes that are allocated, a rate of incoming events, a CPU usage value, a cache utilization percentage, or a combination thereof, and
the set of parameters for the application includes a number of threads for the application, a size of memory allocated for the application, a batch size, a batch timeout value, CPU allocation, a size of cache allocated, a number of web servers allocated, or a combination thereof, the method further comprising:
calculating the rate of change in occurrences of the detected type of the plurality of events of the application during each of the predetermined time periods; and
changing the number of threads for the application, the size of memory allocated for the application, the batch size, the batch timeout value, the CPU allocation, the size of cache allocated, the number of web servers allocated, or a combination thereof, in proportion to the calculated rate of change in occurrences of the detected type of the plurality of events of the application.

16. The method of claim 9, further comprising:
based on a determination that the calculated rate of change in the maintained event counts of the number of occurrences of the plurality of events of the application is decreasing by a first rate, decreasing a value of a parameter among the set of parameters by a first amount that correlates to the first rate; and
based on a determination that the calculated rate of change in the maintained event counts of the number of occurrences of the plurality of events of the application is decreasing by a second rate that is greater than the first rate, decreasing the value of the parameter among the set of parameters by a second amount that correlates to the second rate.

17. A non-transitory computer-readable medium on which is stored machine-readable instructions that, when executed by a processor, cause the processor to:
detect events of an application, the events being associated with a performance characteristic of the application;
identify levels associated with the events of the application for predetermined time periods, the identified levels being correlated to a number of occurrences of the event of the application during each of the predetermined time periods;
calculate a rate of change in the identified levels associated with the events of the application over the predetermined time periods; and
tune values of a set of parameters for the application in proportion to the calculated rate of change in the identified levels associated with the events of the application over the predetermined time periods by decreasing the values of the set of parameters for the application in proportion to the decrease in the calculated rate of change in the identified levels associated with the events of the application based on a decrease in the calculated rate of change in the identified levels associated with the events of the application, wherein the application is executed based on the tuned values of the set of parameters for the application.

18. The non-transitory computer-readable medium of claim 17, wherein the instructions cause the processor to:
based on an increase in the calculated rate of change in the identified levels associated with the events of the application, tune the values of the set of parameters for the application by increasing the values of the set of parameters for the application in proportion to the increase in the calculated rate of change in the levels associated with the events of the application.

19. The non-transitory computer-readable medium of claim 17, wherein the instructions cause the processor to:
in response to the values for the set of parameters for the application being tuned, detect second events of the application, the second events being associated with the performance characteristic of the application;
calculate a second rate of change in levels associated with the second events of the application; and
based on the calculated second rate of change in the levels associated with the second events of the application being the same as the calculated rate of change in the levels associated with the events of the application, tune values of a second set of parameters for the application in proportion to the calculated second rate of change in the levels associated with the second events of the application, the second set of parameters for the application being different than the set of parameters for the application.

20. The non-transitory computer-readable medium of claim 17, wherein the instructions cause the processor to:
based on a determination that the set of parameters for the application does not require an application restart to apply changes to the set of parameters for the application,
apply the tuned values of the set of parameters for the application without the application restart; and
based on a determination that the set of parameters for the application requires the application restart to apply changes to the set of parameters for the application, change the values for the set of parameters in a configuration file associated with the set of parameters for the application; and
output a notification to restart the application.

* * * * *